US007487343B1

(12) United States Patent
Insley et al.

(10) Patent No.: US 7,487,343 B1
(45) Date of Patent: Feb. 3, 2009

(54) METHOD AND APPARATUS FOR BOOT IMAGE SELECTION AND RECOVERY VIA A REMOTE MANAGEMENT MODULE

(75) Inventors: Mark Insley, Sunnyvale, CA (US); Thomas Holland, Mountain View, CA (US); Pradeep Kalra, San Jose, CA (US); Peter Snyder, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 379 days.

(21) Appl. No.: 11/073,260

(22) Filed: Mar. 4, 2005

(51) Int. Cl.
G06F 9/24 (2006.01)
(52) U.S. Cl. .................. 713/1; 713/2; 713/100
(58) Field of Classification Search ............ 713/1–601; 714/2
See application file for complete search history.

(56) References Cited

U.S. PATENT DOCUMENTS

| | | | |
|---|---|---|---|
| 4,670,880 A | 6/1987 | Jitsukawa et al. | |
| 5,241,549 A | 8/1993 | Moon et al. | |
| 5,555,438 A | 9/1996 | Blech et al. | |
| 5,664,101 A | 9/1997 | Picache | |
| 5,815,652 A * | 9/1998 | Ote et al. ................ | 714/31 |
| 5,822,514 A | 10/1998 | Steinz et al. | |
| 5,881,078 A | 3/1999 | Hanawa et al. | |
| 6,275,526 B1 | 8/2001 | Kim et al. | |
| 6,335,967 B1 | 1/2002 | Blomkvist et al. | |
| 6,507,929 B1 | 1/2003 | Durham et al. | |
| 6,586,911 B1 | 7/2003 | Smith | |
| 6,651,190 B1 * | 11/2003 | Worley et al. ............ | 714/43 |
| 6,690,733 B1 | 2/2004 | Baumgartner et al. | |
| 6,697,962 B1 * | 2/2004 | McCrory et al. .......... | 714/27 |
| 6,728,908 B1 | 4/2004 | Fukuhara et al. | |
| 6,920,502 B2 | 7/2005 | Araujo et al. | |
| 6,976,058 B1 * | 12/2005 | Brown et al. ............. | 709/217 |
| 7,003,563 B2 | 2/2006 | Leigh et al. | |
| 7,024,551 B2 * | 4/2006 | King et al. ............... | 713/2 |
| 7,225,327 B1 * | 5/2007 | Rasmussen et al. ....... | 713/2 |
| 7,234,051 B2 * | 6/2007 | Munguia et al. .......... | 713/2 |
| 2001/0056483 A1 | 12/2001 | Davis | |
| 2003/0061320 A1 | 3/2003 | Grover et al. | |
| 2003/0088655 A1 | 5/2003 | Leigh et al. | |
| 2005/0033952 A1 | 2/2005 | Britson | |

(Continued)

FOREIGN PATENT DOCUMENTS

EP   0 621 706   10/1994

(Continued)

OTHER PUBLICATIONS

Phillips Semiconductors, The 12C Bus Specification, Jan. 2000, Version 2.1-2000, pp. 6,,7,10, 13-15.

(Continued)

*Primary Examiner*—Thomas Lee
*Assistant Examiner*—Paul B Yanchus, III
(74) *Attorney, Agent, or Firm*—Perkins Coie LLP

(57) ABSTRACT

A system is provided including a host processing system and a remote management module coupled to it. The host processing system includes a boot storage device storing a plurality of boot images to allow the remote management module to remotely select a boot image from the plurality of boot images and to remotely cause the host processing system to boot utilizing the selected boot image.

25 Claims, 10 Drawing Sheets

U.S. PATENT DOCUMENTS

| | | | |
|---|---|---|---|
| 2005/0044207 A1 | 2/2005 | Goss et al. | |
| 2005/0144493 A1* | 6/2005 | Cromer et al. | 713/310 |
| 2005/0188071 A1 | 8/2005 | Childress et al. | |
| 2005/0193021 A1 | 9/2005 | Peleg | |
| 2005/0283606 A1* | 12/2005 | Williams | 713/166 |
| 2005/0288828 A1 | 12/2005 | Claseman | |
| 2006/0039468 A1 | 2/2006 | Emerson et al. | |

FOREIGN PATENT DOCUMENTS

| | | |
|---|---|---|
| JP | 58181395 | 10/1983 |
| WO | WO-03023561 | 3/2003 |

OTHER PUBLICATIONS

PCT International Search Report and Written Opinion for PCT/US2006/007287; Intl Fling Date: Feb. 28, 2006; Mailing Date: Jul. 6, 2006 (11 pages).

PCT International Search Report and Written Opinion for PCT/US2006/007231, Int'l filing date: Feb. 28, 2006; Mailing date: Aug. 8, 2006 (10 pages).

* cited by examiner

```
> % ssh user@or-085-rlm
> user@or-085-rlm's password:
> RLM or-085>
> RLM or-085> system reset ?
> system reset backup - reset the system using the backup firmware
> system reset current - reset the system using the current firmware
> system reset primary - reset the system using the primary firmware
>
> RLM or-085> system reset primary
> This will cause a dirty shutdown of your appliance.  Continue? [y/n]
>
> RLM or-085> system reset backup
> This will cause a dirty shutdown of your appliance.  Continue? [y/n]
>
> RLM or-085>
> RLM or-085> system reset
> This will cause a dirty shutdown of your appliance.  Continue? [y/n]
> RLM or-085>
> RLM or-085>
```

FIG. 8

METHOD AND APPARATUS FOR BOOT IMAGE SELECTION AND RECOVERY VIA A REMOTE MANAGEMENT MODULE

FIELD OF THE INVENTION

At least one embodiment of the present invention pertains to remote management of a processing system and more particularly, to a method and apparatus for boot image selection and recovery via a remote management module.

BACKGROUND

When a computer system is started or reset, either by turning the power on or requesting a reset operation, the computer system executes a series of instructions in a process called "bootstrapping" or "boot process" in order to prepare the computer system for operations under the operating system. During the boot process, the Central Processing Unit (CPU) fetches initial program instructions (e.g., basic input/output system (BIOS)) from a predetermined location. The initial program instructions, a boot sequence, are typically responsible for performing basic hardware tests and loading a boot image into system memory. A boot image may be stored in a non-volatile storage device, a boot memory, such as a read only memory (ROM), programmable ROM (PROM), flash memory, etc.

Some computer systems incorporate multiple copies of the boot image (e.g., by maintaining a primary boot image and a backup the boot image) so that the operating system can be loaded and initialized even if one of the boot images becomes corrupted. When the system fails to boot utilizing the primary boot image, an operator may attempt to boot the system utilizing the backup boot image. In order to select the backup boot image, however, it may be necessary to physically manipulate the system's hardware (e.g., by moving a jumper on the motherboard or by pressing a designated control button). Such a requirement is inconvenient and time consuming, as it prevents an operator from selecting a boot image and booting the system with the selected boot image remotely.

In many types of computer networks, it is desirable to be able to perform certain management related functions on processing system, including an ability to reboot the processing system, from a remote location. For example, a business enterprise may operate a large computer network that includes numerous client and server processing systems (hereinafter "clients" and "servers", respectively). With such a network, it may be desirable to allow a network administrator to perform or control various functions on the clients and/or servers from a remote console via the network.

Some existing computer systems allow management related functions to be performed remotely via a network. In one approach, a device known as a service processor is incorporated into a processing system to enable remote management of the processing system (referred to as the "host" processing system) via a network. The service processor is often in the form of a dedicated circuit card separate from the other elements of the host processing system. The service processor normally has a network interface that connects to the network and a separate internal interface that connects to one or more components of the processing system. The service processor typically includes control circuitry (e.g., a microprocessor or microcontroller), which is programmed or otherwise configured to respond to commands received from a remote administrative console via the network, and to perform at least some of the management functions mentioned above.

The known service processor technology, however, does not enable a user to use a service processor to boot the host processing system remotely, utilizing a backup boot image in the event of a boot failure of the host processing system, such as may be due to the boot image corruption.

SUMMARY

A system and method are provided for boot image selection and recovery utilizing a remote management module. The system includes a host processing system and a remote management module coupled to it. The host processing system includes a boot storage device storing a plurality of boot images to allow the remote management module to remotely select a boot image from the plurality of boot images and to remotely cause the host processing system to boot utilizing the selected boot image.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 8 illustrates an image selection screen capture, according to embodiments of the invention;

DETAILED DESCRIPTION

Figure 1:
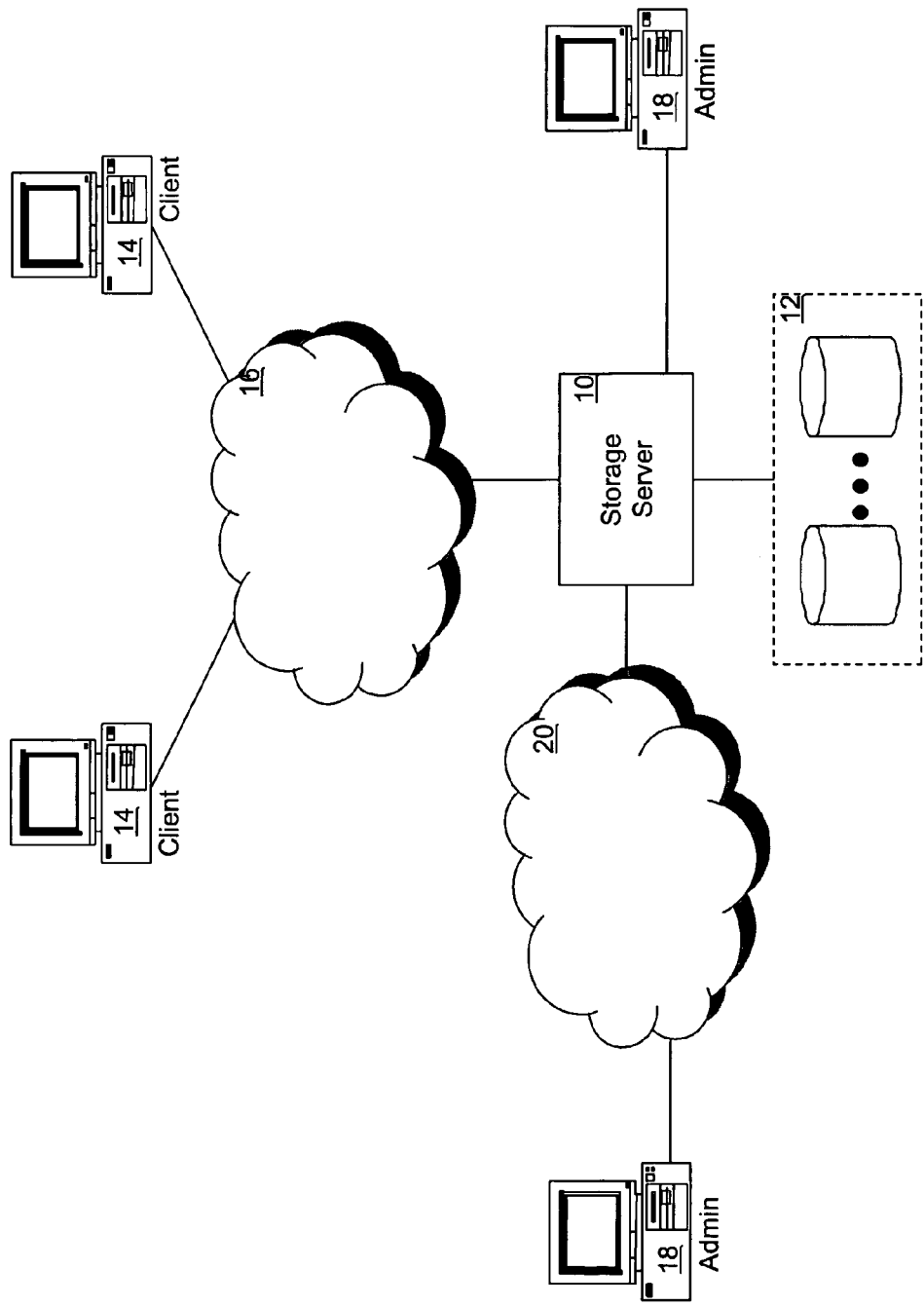
FIG. 1 illustrates a network environment which includes a storage server that can be managed remotely from an administrative console, according to embodiments of the present invention.

As described in detail below, the technique introduced herein enables a boot image to be selected in a host processing system remotely, by using a service processor in the host processing system. In one embodiment of the present invention, the host processing system includes multiple boot images stored in a boot storage device of the host processing system. The multiple boot images may comprise a primary boot image and a backup boot image, where the backup boot image is to be used in the event if the primary boot image becomes corrupted or, alternatively, boot images providing different features supported by the operating system.

For example, when the host processing system is updated with a new version of firmware, the new firmware may fail when an operator first attempts to use it. It may be convenient to bring up the host processing system utilizing a backup boot image (here, backup firmware) while the defective new version is being corrected. In another scenario, a primary boot image may become corrupted so that the host processing system fails to boot with the primary boot image. In this situation, in order to recover from the boot failure, the host processing system may be booted with a backup copy of the primary boot image. In yet another scenario, it may be desirable to alternately boot the host processing system with boot images including different sets of operating system features. The boot storage device may store boot images corresponding to different feature sets (and, in one embodiment, backup boot images for each primary boot image), such that an operator may selectively boot the host processing system with the desired set of features.

In order to provide remote selection of a boot image, the host processing system may utilize a service processor installed in the host processing system or coupled to the host processing system via a dedicated link. The service processor may be configured to allow an operator to perform management and diagnostic functions, such as boot image selection, on the host processing system remotely, e.g., over a network, as well as boot image selection. The service processor that is capable of controlling its host processing system remotely may be referred to as a remote management module (RMM). An RMM, according to an illustrative embodiment of the present invention, may be implemented as an add-on card and may provide console port capabilities over a local area network (LAN) or wide area network (WAN) connection and CLI functions to allow remote management of the host processing system. The host processing system may include an agent component, which is used to monitor for various events in the host processing system and to act as an intermediary between the RMM and the control circuitry of the host processing system. In accordance with embodiments of the invention, as described in greater detail below, the agent and the RMM cooperatively implement an abstraction layer, through which the host processing system and the RMM communicate event data and other information. The abstraction layer makes the RMM more platform-independent and, thus, more usable for various different designs of host processing system.

In one embodiment of the present invention, the RMM allows for remote commands to be received at the host processing system via a secure network connection. The RMM has a communications path to an agent on the host processing system. The agent operates independently of the host processing system's operating system so that it is able to respond to RMM requests even when the processing systems boot code is corrupted. When so instructed via the communication path from the RMM, the agent can select a different boot image for the host processing system to boot from as it comes out of reset.

In one embodiment, a RESET command may be provided with the command line interface (CLI) of the RMM. The RESET command may be implemented to accept a parameter indicating which boot image is to be utilized to boot the host processing system. The parameter may designate, for example, a primary boot image, a backup boot image, or a current boot image. When an operator (e.g., a network administrator) issues a RESET command specifying a particular boot image, the command is sent to the RMM via a network, where it is formatted by an agent application running on the RMM. The RMM then sends the formatted command to an agent component in the host processing system. The agent receives the command, interprets the command, and causes the host processing system to take action specific to its hardware circuitry in order to boot with the specified boot image.

In one embodiment, the present invention may be implemented in the context of a storage-oriented network, i.e., a network that includes one or more storage servers that store and retrieve data on behalf of one or more clients. Such a network may be used, for example, to provide multiple users with access to shared data or to backup mission critical data. An example of such a network is illustrated in FIG. 1.

In FIG. 1, a storage server 10 is coupled locally to a storage subsystem 12, which includes a set of mass storage devices, and to one or more clients 14 through a network 16, such as a LAN or WAN. The storage server 10 operates on behalf of the clients 14 to store and manage shared files or other units of data (e.g., blocks) in the set of mass storage devices. Each of the clients 14 may be, for example, a conventional personal computer (PC), workstation, or the like. The storage subsystem 12 is managed by the storage server 10. The storage server 10 receives and responds to various read and write requests from the clients 14, directed to data stored in, or to be stored in, the storage subsystem 12. The mass storage devices in the storage subsystem 12 may be, for example, conventional magnetic disks, optical disks such as CD-ROM or DVD based storage, magneto-optical (MO) storage, or any other type of non-volatile storage devices suitable for storing large quantities of data. The mass storage devices may be organized into one or more volumes of Redundant Array of Inexpensive Disks (RAID).

Also shown in FIG. 1 is an administrative console 18 coupled to the storage server 10. The storage server 10 in this configuration includes a serial port (e.g., RS-232) and appropriate software to allow direct communication between the storage server 10 and the administrative console 18 through a transmission line. This configuration enables a network administrator to perform at least some of the types of management functions mentioned above on the storage server 10.

A storage server 10 can have a service processor (here, an RMM 60) coupled to it, which enables remote management of the processing system via a network 20, and an agent 58, which is used to monitor for various events in the processing system and acts as an intermediary between the RMM 60 and the control circuitry of the processing system. The storage server 10 can be managed through a network 20 from a remote administrative console 18, in addition to being capable of being managed through the direct serial interface. It will be noted, that while network 16 and network 20 are depicted as separate networks in FIG. 1, they can be the same network. Furthermore, although the processing system to be remotely managed illustrated in FIG. 1 is a storage server 10, it will be recognized that the technique introduced herein can also be applied to essentially any other type of network-connected processing system, such as standard personal computers (PCs), workstations, servers other than storage servers, etc. The storage server 10 may be, for example, a file server, and more particularly, may be a network attached storage (NAS) appliance. Alternatively, the storage server 10 may be a server that provides clients 14 with access to individual data blocks, as may be the case in a storage area network (SAN). Alternatively, the storage server 10 may be a device that provides clients 14 with access to data at both the file level and the block level.

Figure 2:
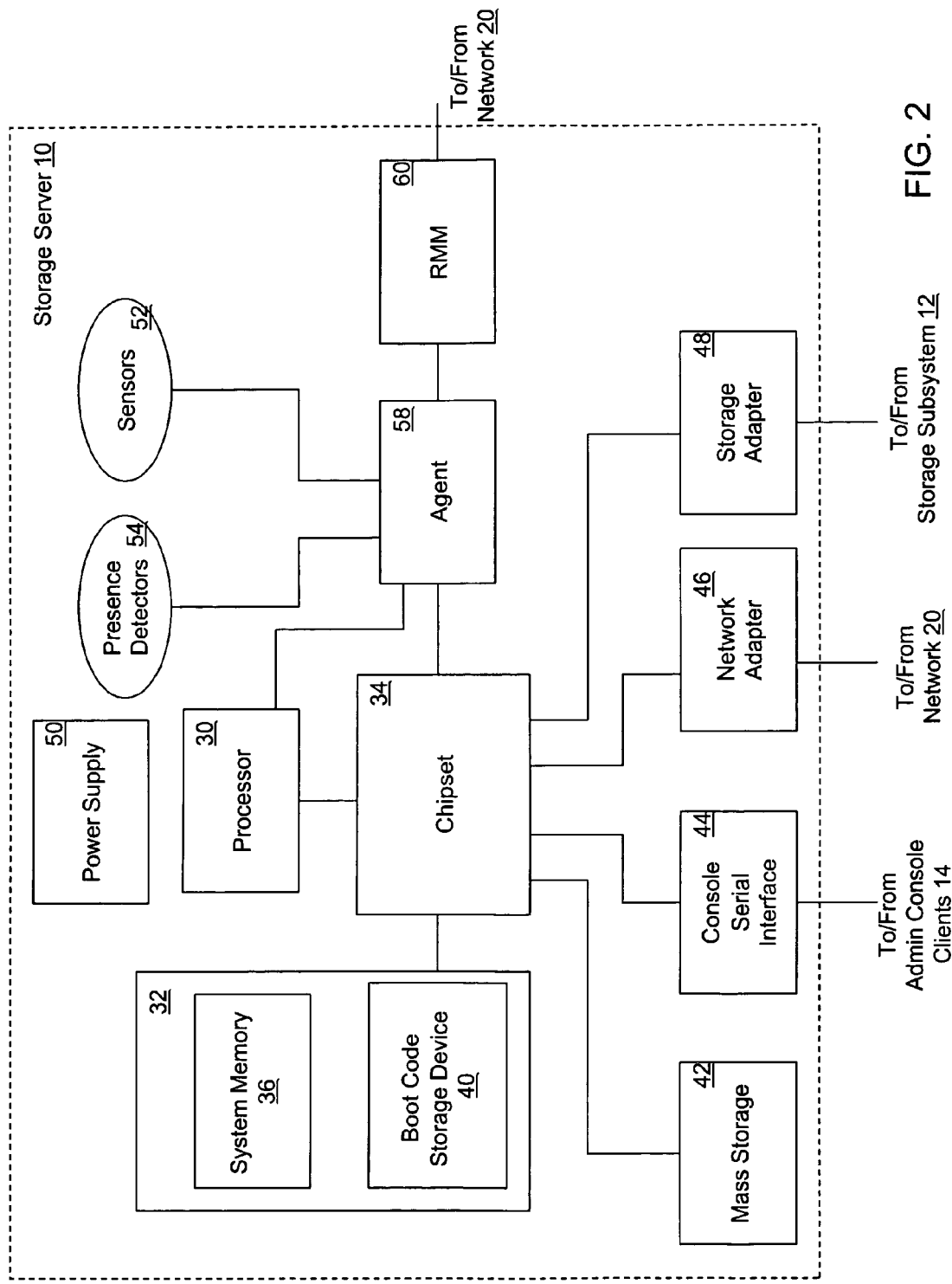
FIG. 2 is a block diagram of the storage server with a service processor, according to embodiments of the invention.

FIG. 2 is a high-level block diagram of the storage server 10, according to at least one embodiment of the invention, with an RMM 60 included in it in order to enable remote management of the storage server 10 from an administrative console 18 via the network 20. The administrative console 18 may be in communication with the storage server 10 either directly via serial interface 44 or over a network via the RMM 60. In one embodiment, the RMM 60 is an add-in circuit card separate from the components of the storage server 10. The storage server 10 may be referred to as a host processing system or an appliance processing system. It will be noted that in some embodiments the storage server 10 may be referred to as including a host processing system (e.g., comprising an operating system with any applications running on it and an agent component) and an RMM 60.

The storage server 10 includes one or more processors 30 and memory 32, which are coupled to each other through a chipset 34. The chipset 34 may include, for example, a conventional Northbridge/Southbridge combination. The processor(s) 30 represent(s) the central processing unit (CPU) of the storage server 10 and may be, for example, one or more programmable general-purpose or special-purpose microprocessors or digital signal processors (DSPs), microcontrollers, application specific integrated circuits (ASICs), programmable logic devices (PLDs), or a combination of such devices. The memory 32 includes a system memory 36, such as random access memory (RAM), to store processor data and instructions and a boot code storage device 40. The boot code storage device 40 is preferably a non-volatile memory device suitable for storing code required to transition the storage server 10 from a standby or off state to an operational state in which application or operating system programs can run. The boot code storage device 40 includes a set of instructions that are executed immediately after the system is booted, as well as one or more boot images. The boot code is responsible for loading a boot image into system memory 36 of the storage server 10 in response to a boot event, such as powering on the storage server 10, pushing a reset button on the system cabinet, or a remote power up or RESET command received from the RMM 60. A boot image, for purposes of this disclosure refers to a system memory image that includes an operating system kernel as well as any file systems, libraries, and programs necessary to bring the storage server to a functional state.

The storage server 10 may also include one or more internal mass storage devices 42, a console serial interface 44, a network adapter 46 and a storage adapter 48, which are coupled to the processor(s) 30 through the chipset 34. The storage server 10 may further include redundant power supplies 50. The internal mass storage devices 42 may be or include any conventional medium for storing large volumes of data in a non-volatile manner, such as one or more magnetic or optical based disks. The serial interface 44 allows a direct serial connection with a local administrative console, such as console 18 in FIG. 1, and may be, for example, an RS-232 port. The storage adapter 48 allows the storage server 10 to access the storage subsystem 12 and may be, for example, a Fibre Channel adapter or a SCSI adapter. The network adapter 46 provides the storage server 10 with the ability to communicate with remote devices, such as the clients 14, over network 16 and may be, for example, an Ethernet adapter.

The storage server 10 further includes a number of sensors 52 and presence detectors 54. The sensors 52 are used to detect changes in the state of various environmental variables in the storage server 10, such as temperatures, voltages, binary states, etc. The presence detectors 54 are used to detect the presence or absence of various components within the storage server 10, such as a cooling fan, a particular circuit card, etc.

In FIG. 2, the RMM 60 is coupled to the host processing system (here, the storage server 10) via a dedicated hardware link 56. The hardware link 56 may be, for example, a serial port connection, a parallel port connection, or an inter-IC (IIC or I$^2$C) bus. An agent 58, which may be implemented as a hardware component of the storage server 10 that serves as an intermediary between the host processing system and the RMM 60. The RMM 60 may control the host processing system via the agent 58 and is capable of booting or resetting the host processing system with a selected boot image stored in the boot storage device 40. The RMM 60 is capable of rebooting the storage server 10 utilizing a backup boot image either responsive to a command issued by an operator via an administrative console 18 or automatically, responsive to an indication of boot failure of the host processing system.

Figure 3:
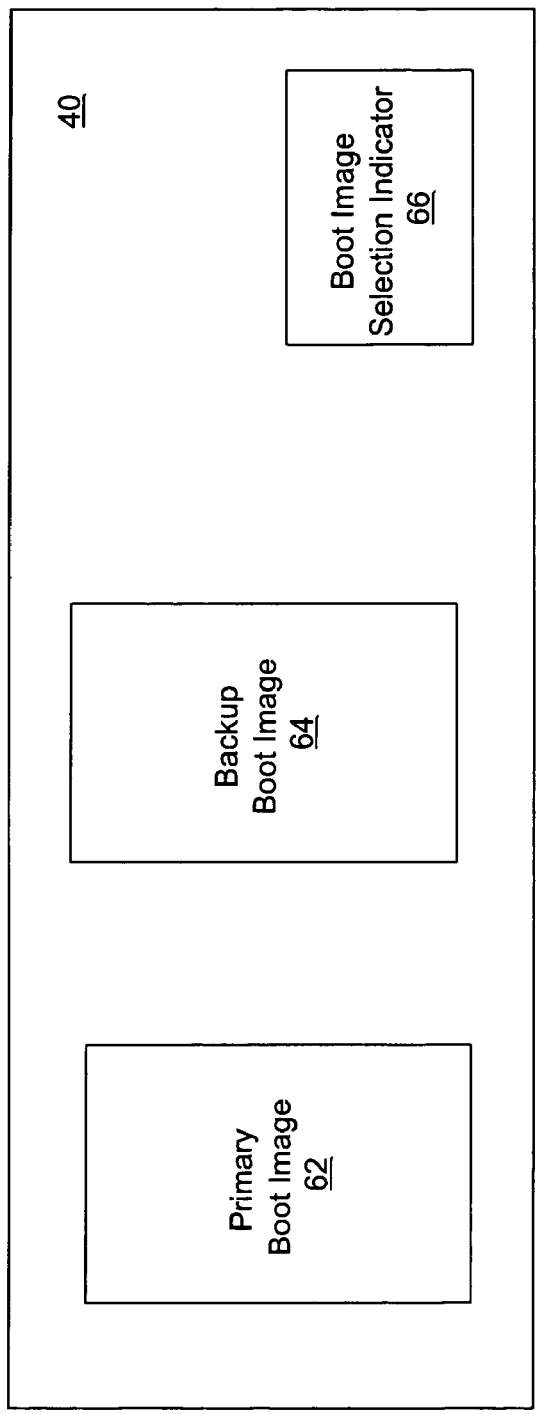
FIG. 3 is a diagrammatic representation of a boot code storage device storing a plurality of boot images, according to embodiments of the invention.

FIG. 3 illustrates the boot storage device 40 storing a plurality of boot images, each boot image comprising the operating system of the storage server 10. In one embodiment, the plurality of boot images include a primary boot image 62, which may be utilized as a default boot image, and a backup boot image 64, which may be utilized in the event of the primary boot image becoming corrupted. In an alternative embodiment, rather than or in addition to providing multiple copies of the same firmware (i.e., multiple copies of a boot image), the plurality of boot images may include different firmware versions that provide different operating system features (e.g., BIOS firmware and Common Firmware Environment (CFE) firmware).

In one embodiment, the boot code storage device 40 is implemented with flash memory in a configuration commonly referred to as a flash card. The use of flash memory for boot code storage device 40 enables reprogramming of the boot code to include flash code updates and revisions. The boot code storage device may be capable of selecting a boot image from two or more boot images on the boot code storage device, in response to a command from the RMM, and storing the loading the selected boot image into the system memory 36. The boot code storage device 40 illustrated in FIG. 3 may include a boot image selection indicator 66, which may be implemented as a flag storing a value indicative of the currently selected boot image, in addition to the primary and backup boot code images 62 and 64. In response to a boot event, the boot code sequence determines the state of image selection indicator 66. In one embodiment, image selection indicator 66 is in an initial state (e.g., pointing to a default boot image) when the computer system is powered on for the first time and remains in the initial state until manipulated by the agent 58 responsive to a command received by the agent 58 from the RMM 60. The boot sequence determines the state of the image selection indicator 66 and attempts to load the corresponding boot image. Although the depicted embodiment indicates image selection indicator 66 as contained within the boot code storage device 40, other embodiments may include non-volatile storage external to boot code storage device such as an external EPROM, an additional flash memory device, or a battery backed CMOS storage device in which image selection indicator 66 is stored.

The RMM 60 uses command packets to control certain functions in the host processing system utilizing the agent 58. The agent 58, at a high level, monitors various functions and states within the storage server 10 and acts as an intermediary between the RMM 60 and the other components of the storage server 10. In certain embodiments, the agent 58 is implemented as one or more integrated circuit (IC) chips, such as a programmable interrupt control (PIC), a PIC in combination with an FPGA, or some other configuration.

Figure 4:
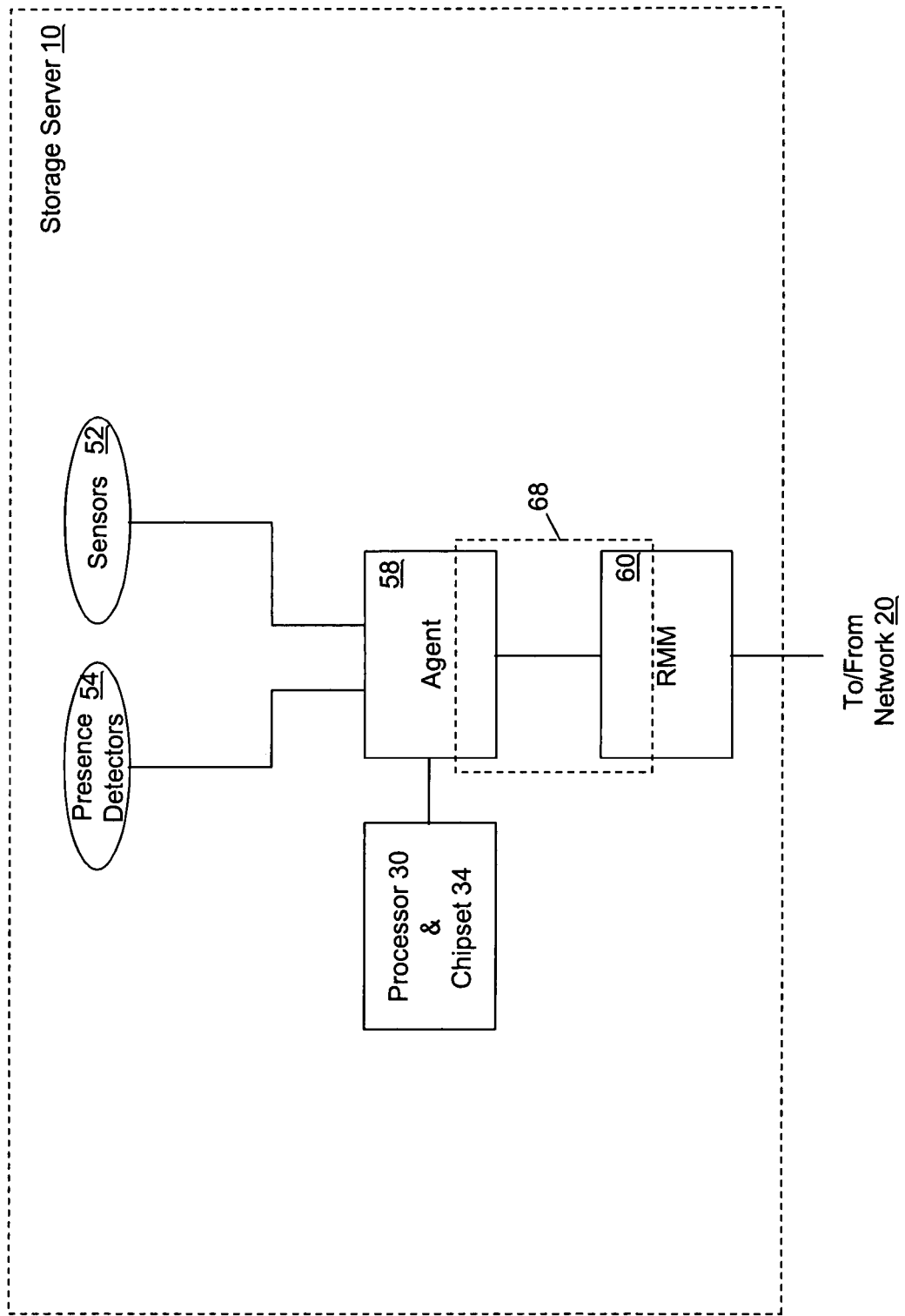
FIG. 4 is a block diagram showing an abstraction layer between the agent and the RMM, according to embodiments of the invention.

Referring to FIG. 4, the agent 58 and the RMM 60 cooperatively implement an abstraction layer 68, through which the agent 58 and the RMM 60 communicate event data, control commands requested by an operator remotely or issued automatically by the RMM 60, and other information. The agent 58 continuously monitors for any of various events that may occur within the storage server 10. The RMM 60 may receive event data from the agent 58 and then transmit the event record data to a remote administrative console 18 of FIG. 1 over the network 20, where the data can be used to output an event notification to the network administrator. For example, responsive to an event notification indicating that the storage server 10 failed to boot, an appropriate command may be issued from the RMM 60 (e.g., a RESET command with a backup boot image as a parameter) in order to attempt recovery from the boot failure.

Figure 5:
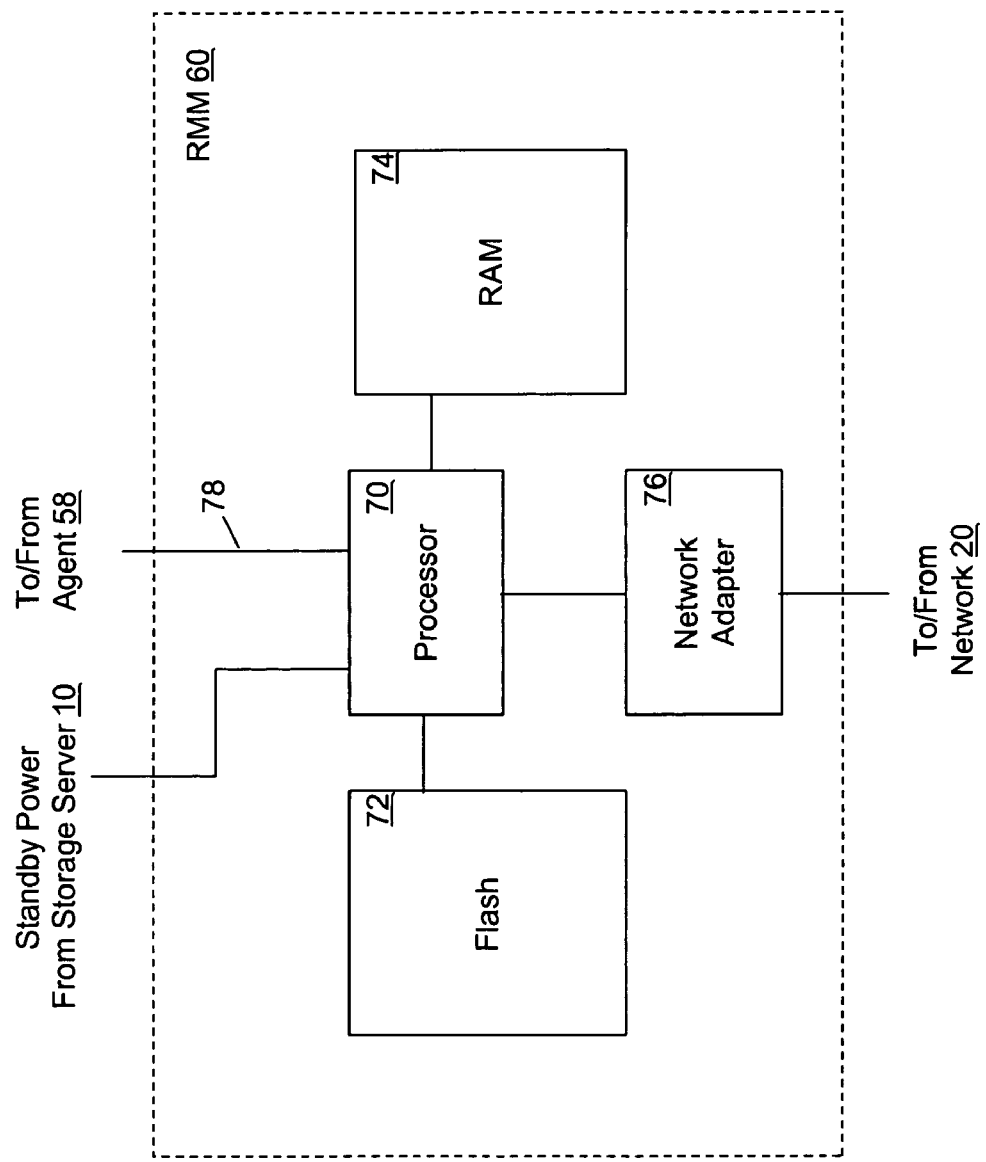
FIG. 5 is a block diagram showing components of the RMM, according to embodiments of the invention.

FIG. 5 is a high-level block diagram showing the relevant components of the RMM 60, according to certain embodiments of the invention. The RMM 60 provides a network interface and is used to allow a remote processing system, such as an administrative console, to control and/or perform various management functions on the storage server 10 (i.e., in the host processing system) via network 20, which may be a LAN or a WAN, for example. The management functions may include, for example, monitoring various functions and state in the storage server 10, configuring the storage server 10, performing diagnostic functions on and debugging the storage server 10, upgrading software on the storage server 10, etc. The RMM 60 is designed to operate independently of the storage server 10. Hence, the RMM 60 runs on standby power so that it is available even when the main power to the storage server 10 is off. In certain embodiments of the invention, the RMM 60 provides diagnostic capabilities for the storage server 10 by maintaining a log of console messages that remain available even when the storage server 10 is down. The RMM 60 is designed to provide enough information to determine when and why the storage server 10 went down, even by providing log information beyond that provided by the operating system of the storage server 10. This functionality includes the ability to send a notice to the remote administrative console 18 on its own initiative, indicating that the storage server 10 is down, even when the storage server 10 is unable to do so. Furthermore, the RMM 60 may be utilized to reset the storage server with a backup boot image in the event if the storage server fails to boot with the primary boot image.

The various components of the RMM 60 may be implemented on a dedicated circuit card installed within the storage server. The RMM 60 includes control circuitry, such as one or more processors 70, as well as various forms of memory coupled to the processor, such as flash memory 72 and RAM 74. The RMM 60 further includes a network adapter 76 to connect the RMM 60 to the network 20. The network adapter 76 may be or may include, for example, an Ethernet (e.g., TCP/IP) adapter. Although not illustrated as such, the RMM 60 may include a chipset or other form of controller/bus structure, connecting some or all of its various components.

The processor(s) 70 is/are the CPU of the RMM 60 and may be, for example, one or more programmable general-purpose or special-purpose microprocessors, DSPs, microcontrollers, ASICs, PLDs, or a combination of such devices. The processor 70 inputs and outputs various control signals and data 78 to and from the agent 58. In at least one embodiment, the processor 70 is a conventional programmable, general-purpose microprocessor that runs software from local memory on the RMM 60 (e.g., flash 72 and/or RAM 74).

Figure 6:
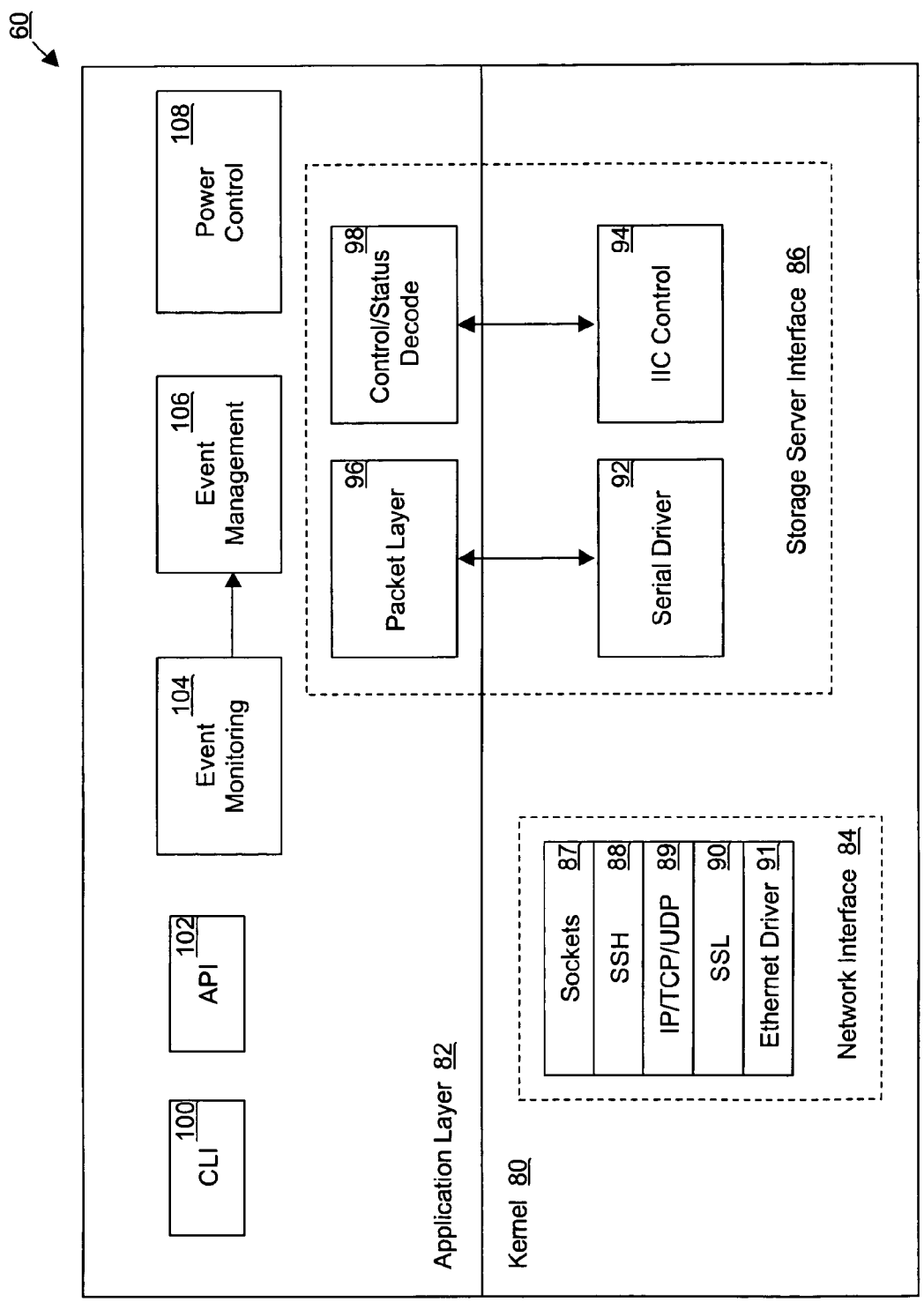
FIG. 6 is a block diagram showing the software architecture in the RMM, according to embodiments of the invention.

FIG. 6 illustrates the relevant aspects of the software of the RMM 60, according to certain embodiments of the invention. At a high level, the software of the RMM 60 has two layers, namely, an operating system kernel 80 and an application layer 82 that runs on top of the kernel 80. In certain embodiments, the kernel 80 is a Linux based kernel. The kernel 80 includes a network interface 84 to control network communications with a remote processing system, and a storage server interface 86 to control communications with the other components of the storage server 10. The network interface 84 includes a protocol stack that includes a sockets layer 87, a Secure Shell (SSH) layer 88, an IP/TCP/UDP layer 89, an SSL layer 90 and an Ethernet driver layer 91. The storage server interface 86 includes a serial driver 92, through which the RMM 60 can communicate with the operating system of the storage server 10, and an IIC control module 94 through which the RMM 60 can communicate with the agent 58 over an IIC bus.

The application layer 82 includes a packet layer 96 that cooperates with the serial driver 92, and a control/status decode layer 98 that cooperates with the IIC control module 94. The packet layer 96 is responsible for converting packets received from other modules in the application layer 82 into a serial format for transmission by the serial driver 92, and for converting serial data received from the serial driver 92 into packet format for use by other modules in application layer 82. The control/status decode layer 98 is responsible for implementing a command packet protocol on the IIC bus for communication with the agent 58.

The application layer 82 also includes: a command line interface (CLI) 100 to allow an authorized user to control functions of the RMM 60; an application programming interface (API) 102, which may be referred to as an agent API, to allow an authorized remote application to make calls to the RMM software; an event monitoring module 104; to request event data from the agent 58; and an event management module 106 to receive event information from the event monitoring module 104; and a power control module 108 to control power to the storage server 10. The direct user interface with the CLI 100 may be protected by establishing the remote connection, e.g., via SSH.

Figure 7:
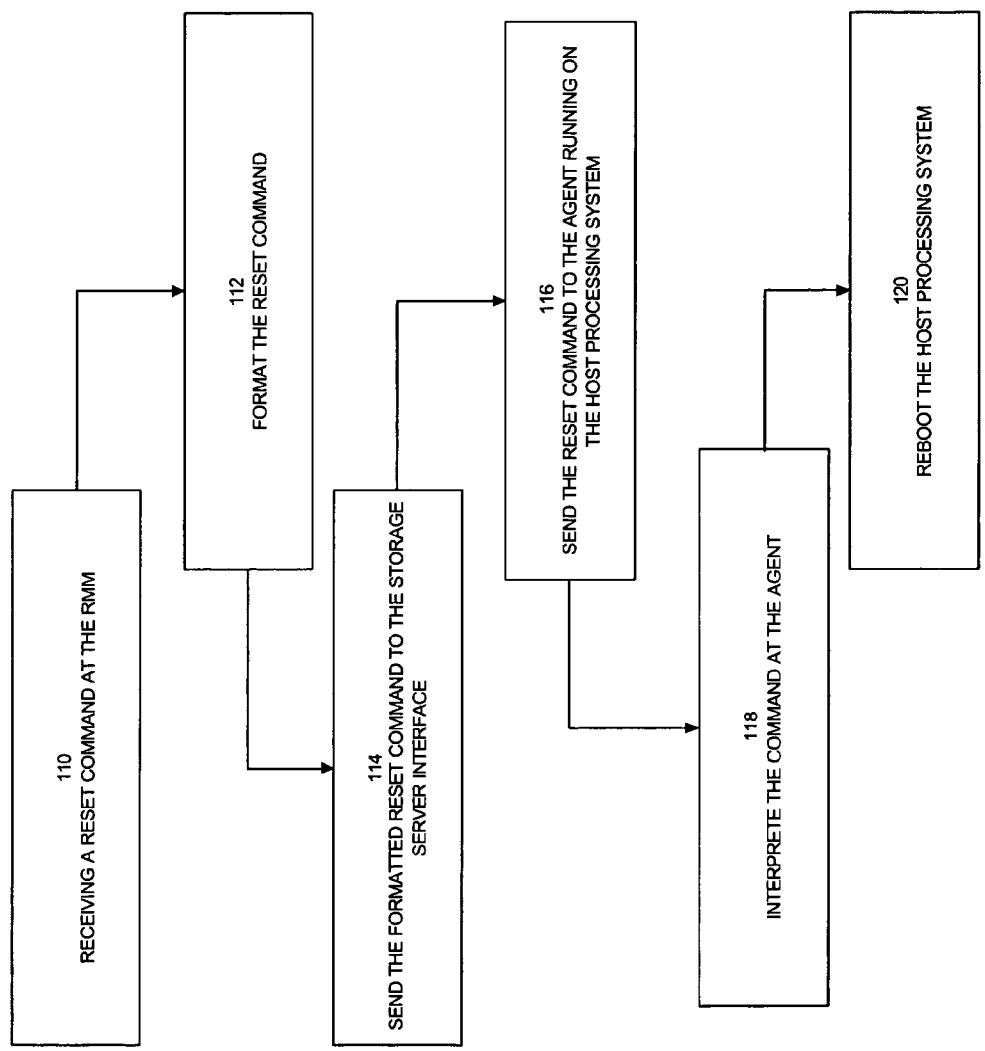
FIG. 7 is a flow chart illustrating a method for selecting a boot image, according to embodiments of the invention.

FIG. 7 is a flowchart illustrating a method for boot image selection and recovery via a remote management module, according to one embodiment of the present invention. In the course of utilizing an appliance processing system such as the storage server 10, there may be a situation where a boot image storing instructions to load the operating system for the storage server 10 becomes corrupted or the storage server 10 is updated with unusable firmware. A corrupted boot image may result in a failure of the storage server 10 to boot. An indication of such failure may be communicated to and received at the RMM 60. In order to attempt recovery from the boot failure, an operator at the administrative console 18 may send a RESET command to the storage server 10, utilizing the RMM 60, requesting the server storage 20 to be reset with a backup boot image (e.g., the boot image 64 of FIG. 2). Alternatively, the RMM 60 may be configured to automatically initiate a RESET command with a backup boot image, e.g., responsive to a boot failure of the storage server 10. When a user connects to the CLI 100 utilizing the administrative console 18 and enters a RESET command, application layer 82 of the RMM 60 receives the RESET command at operation 110, formats it at operation 112, and sends the formatted command, at operation 1114, to the storage server interface 86, which, in one embodiment may be a hardware interface.

At operation 116, the formatted RESET command is sent to the agent 58 running on the host processing system. The agent 58 interprets the command at operation 118 and causes the host processing system to be rebooted, at operation 120, with a boot image specified in the parameter field of the RESET command. The RESET command may be implemented, in one embodiment, to accept at least one parameter to indicate the selected boot image. A RESET command sent without a parameter may cause the host processing system to reboot with the default boot image. An image selection screen capture, according to one embodiment of the present invention, is illustrated in FIG. 8. In FIG. 8, a remote LAN manager (RLM) serves as the RMM 60.

Figure 9:
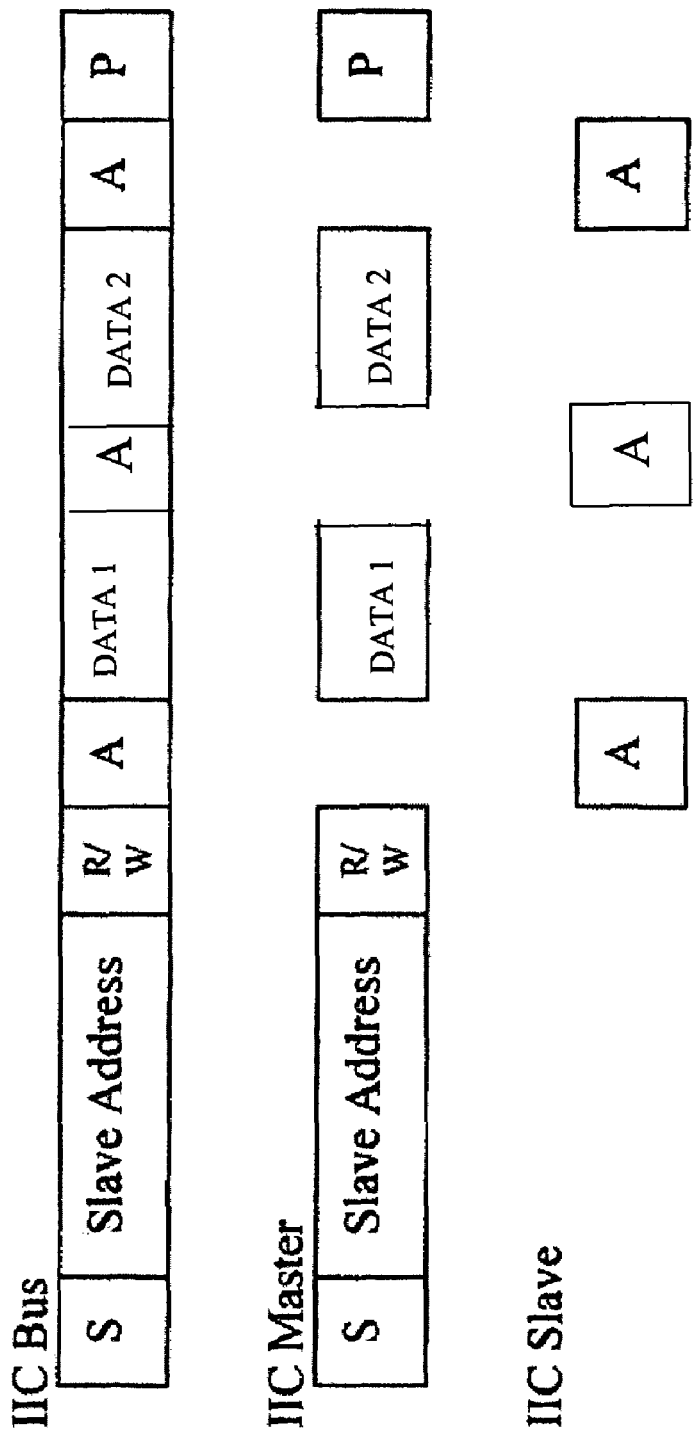
FIG. 9 illustrates the use of a command packet protocol between the agent and the RMM, according to embodiments of the invention.

In one embodiment of the present invention, the RMM 60 uses a command packet protocol to control the storage server 10 utilizing the agent 58. In certain embodiments, the command and data link between the RMM 60 and the agent 58 is the IIC bus; however, in other embodiments a different type of link can be used. A command packet protocol may be implemented on this IIC bus, as described further below. The command packet protocol is described with reference to FIGS. 9 through 11. FIG. 9 illustrates the protocol with a simple three-byte transaction on the IIC bus. The top track shows what the overall transaction looks like on the IIC bus; the middle track shows what the IIC bus master transmits; the bottom track shows what the IIC bus slave transmits. In general, the RMM 60 operates as the IIC bus master and the agent 58 acts as the slave.

Figure 10:
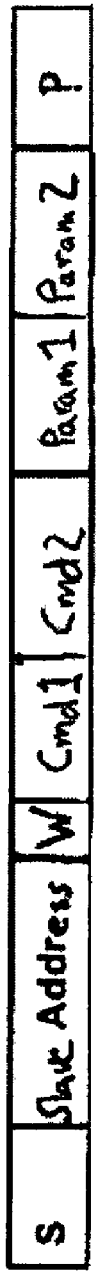
FIG. 10 illustrates the format of a Write packet, according to embodiments of the invention.
Figure 11:
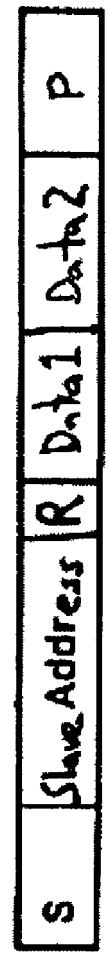
FIG. 11 illustrates the format of a Read packet, according to embodiments of the invention.

In FIGS. 9 through 11, "S" represents a start condition, "P" represents a stop condition, and "A" represents an acknowledgement (ACK). Not shown but potentially used in place of an ACK (A) is "N", which represents a non-acknowledgement (NACK) condition when a transaction fails.

In certain embodiments, the Slave Address field is seven bits representing the combination of a preamble (four bits) and slave device ID (three bits). The device ID bits are typically programmable on the slave device (e.g., via pin strapping). Hence, multiple devices can operate on the same high IIC bus. "R/W" represents a read/write bit (e.g., "1" for reads, "0" for writes).

As IIC does not provide any mechanism to ensure data integrity, certain embodiments of the invention may add such a mechanism to the communications between the agent 58 and the RMM 60 on the IIC bus. In certain embodiments, this mechanism is provided by following each data byte that goes over the IIC bus (i.e., not the Slave Address, the S/A/N or R/W bits) with its 1's complement. This is shown in FIG. 9, where Data1 represents a data byte and Data2 represents the 1's complement of Data1. The receiving device performs an exclusive-OR (XOR) of each data byte and its 1's complement to validate the byte. A data mismatch or failure to transfer the second byte invalidates the first byte, resulting in the first byte being ignored by receiving device.

In order to perform a read operation, the RMM 60 issues a special class of Write command, called a Read Setup command, to the agent 58 over the IIC bus, to tell the agent 58 what the RMM 42 wants to do next. The RMM 60 then performs a Read operation on the IIC bus, to cause the agent 58 to provide the data. FIG. 10 shows the format of a Write packet, according to certain embodiments of the invention. The R/W bit determines whether the packet is a read or a write packet (e.g., "0" for write, "1" for a read), and is therefore shown as a "W" in FIG. 10 to indicate the packet is a Write packet. Each command field, i.e., Cmd1 and Cmd2, is, in certain embodiments, a 16-bit value that specifies the command being transmitted. Command field Cmd2 is the 1's complement of command field Cmd1. The parameter field is an optional field used with certain commands to pass parameter values. In FIG. 10, parameter field Param2 is the 1's complement of parameter field Param1.

FIG. 11 shows the format of a Read packet, according to certain embodiments of the invention. The R/W bit is shown as a "R" in FIG. 11 to indicate that the packet is a Read packet. The Data fields, Data1 and Data2, contain the data returned by the agent 58 to the RMM 60, where Data2 is the 1's complement of Data1.

Many different commands may be implemented between the RMM 60 and the agent 58 over a communication path in the illustrative form of the IIC bus, depending upon the specific needs of the system. One such command is the RESET command. The RESET command, as described above, may take a parameter indicating the boot image to be used for booting the storage server. The RESET command may be sent by the RMM 60 over the IIC bus to the agent 58 in response to an indication of the boot failure of the storage server 10.

Thus, a method and apparatus for boot image selection and recovery via a remote management module have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method including:
   receiving an indication at a service processor located within a host processing system; and
   responsive to receiving the indication at the service processor, sending a reset command from the service processor to an agent located within the host processing system, wherein the agent acts as an intermediary between the service processor and control circuitry of the host processing system and operates independently of an operating system used to boot the host processing system, the reset command identifying a selected boot image from a plurality of boot images, to remotely cause the host processing system to boot utilizing the selected boot image.

2. The method of claim 1, further including storing the plurality of boot images in a boot storage device of the host processing system.

3. The method of claim 1, wherein the indication is associated with a boot failure of the host processing system.

4. The method of claim 1, wherein the sending of the reset command identifying a selected boot image includes:
   formatting the reset command at the service processor;
   sending the reset command to the hardware interface in the service processor;
   sending the reset command via the hardware interface to an agent in the host processing system; and
   identifying, utilizing the agent, an action specific to the host processing system's hardware associated with the reset command.

5. The method of claim 1, wherein the selected boot image is a backup boot image.

6. The method of claim 1, wherein the plurality of boot images include a primary boot image and a backup boot image.

7. The method of claim 1, wherein the plurality of boot images include a BIOS firmware and a Common Firmware Environment (CFE) firmware.

8. The method of claim 1, further including receiving the indication from a user via a command line interface.

9. A storage server comprising:

control circuitry operable to control the storage server;

a remote management module to enable remote management of the storage server via a network; and an agent coupled to the control circuitry and the remote management module, to operate as an intermediary between the remote management module and the control circuitry, wherein the agent further is configured to monitor system events of the storage server and to send system event data to the remote management module, wherein the agent and the remote management module are configured to cooperatively implement an abstraction layer through which the agent and the remote management module communicate, and wherein the remote management module is further configured to respond to the system event data by causing the agent to select a boot image from a plurality of boot images and to cause the storage server to boot utilizing the selected boot image.

10. The storage server of claim 9, wherein the plurality of boot images include a primary boot image and a backup boot image.

11. The storage server of claim 9, wherein the plurality of boot images include a BIOS firmware and a Common Firmware Environment (CFE) firmware.

12. The storage server of claim 9, wherein the control circuitry includes a boot storage device to store the plurality of boot images.

13. The storage server of claim 12, wherein the boot storage device comprises flash memory.

14. The storage server of claim 9, wherein the remote management module is coupled to the control circuitry via an IIC bus.

15. The method of claim 1, wherein the indication indicates a boot failure of the host processing system and is received from the agent.

16. The storage server of claim 9, wherein the remote management module is configured to cause the agent to select the boot image in response to receiving from the agent an indication of a boot failure of the storage server.

17. A storage server comprising:

control circuitry operable to control the storage server;

a network adapter through which the storage server can communicate with a storage client over a network;

a storage adapter through which the storage server can communicate with a set of mass storage devices;

a remote management module to enable remote management of the storage server; and an agent coupled to the control circuitry and to the remote management module, to operate as an intermediary between the remote management module and the control circuitry, wherein the agent operates independently of an operating system used to boot the storage server;

wherein the remote management module is configured to communicate with the agent to cause the agent to select a boot image of a plurality of boot images and to cause the selected boot image to be used to boot the storage server.

18. The storage server of claim 17, wherein the remote management module is configured to cause the agent to select the boot image in response to receiving from the agent an indication of a boot failure of the storage server.

19. The storage server of claim 17, wherein the agent further is configured to monitor system events of the storage server and to send system event data to the remote management module.

20. The storage server of claim 17, wherein the agent and the remote management module are configured to cooperatively implement an abstraction layer through which the agent and the remote management module communicate.

21. The storage server of claim 17, wherein the plurality of boot images include a primary boot image and a backup boot image.

22. The storage server of claim 17, wherein the plurality of boot images include a BIOS firmware and a Common Firmware Environment (CFE) firmware.

23. The storage server of claim 17, wherein the storage server includes a boot storage device to store the plurality of boot images.

24. The storage server of claim 23, wherein the boot storage device comprises flash memory.

25. The storage server of claim 17, wherein the remote management module is coupled to the control circuitry via an IIC bus.

* * * * *